(No Model.)  6 Sheets—Sheet 2.
M. L. WOOD.
ELECTRIC RAILWAY.
No. 553,799.  Patented Jan. 28, 1896.
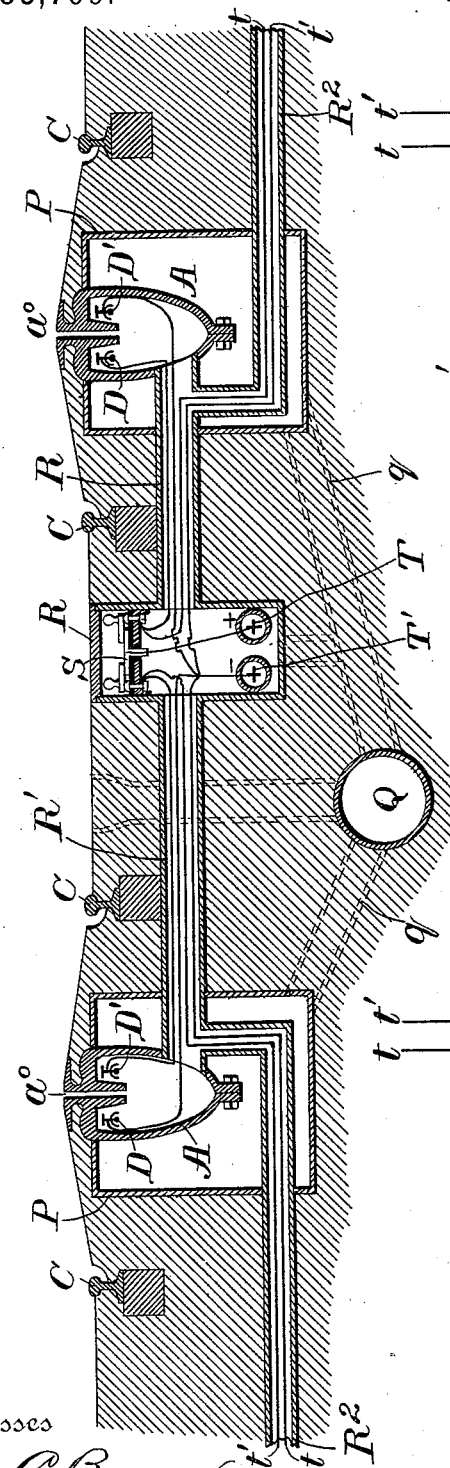
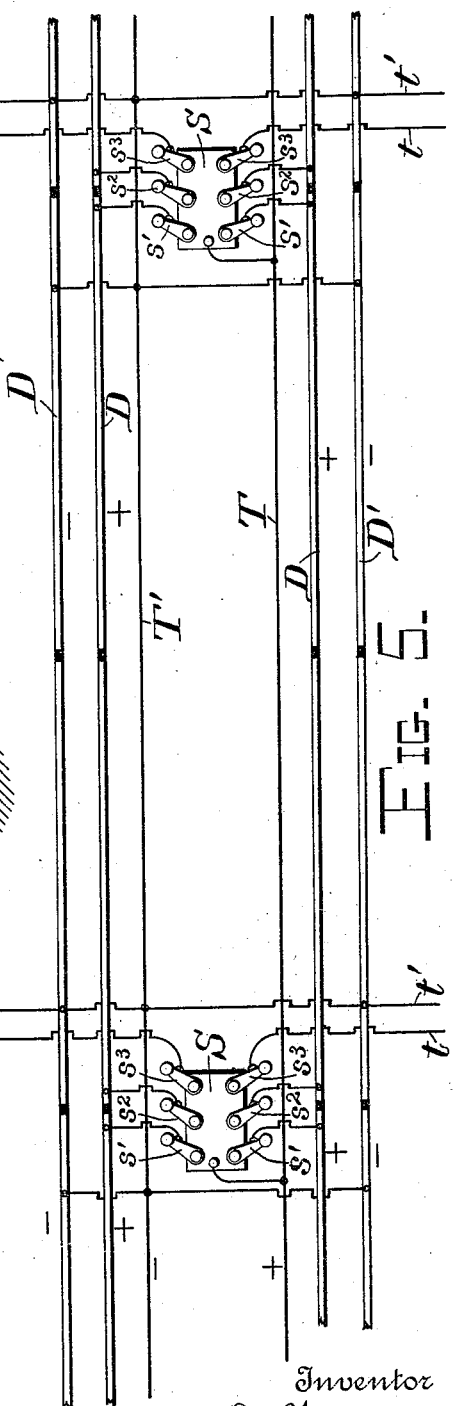

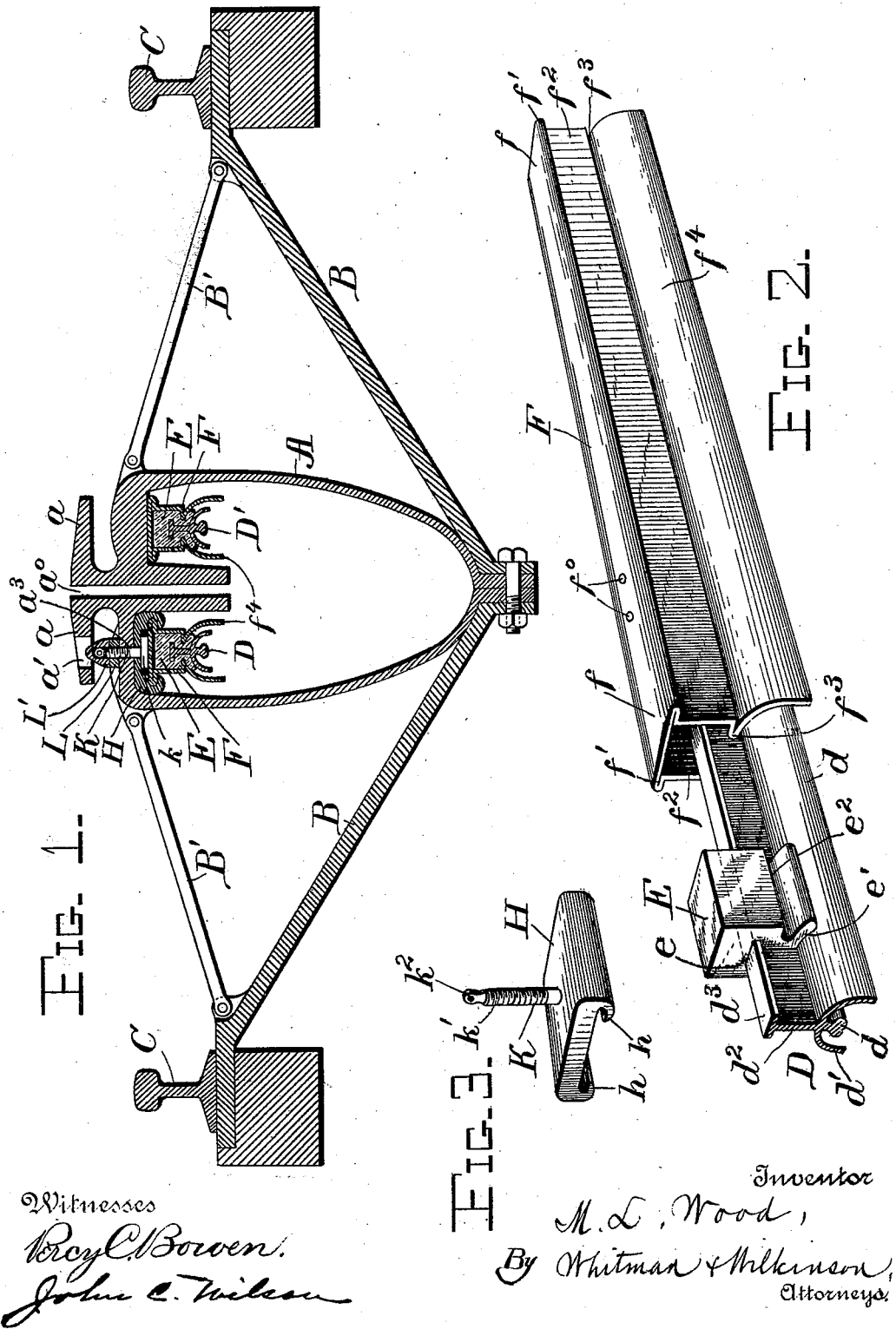

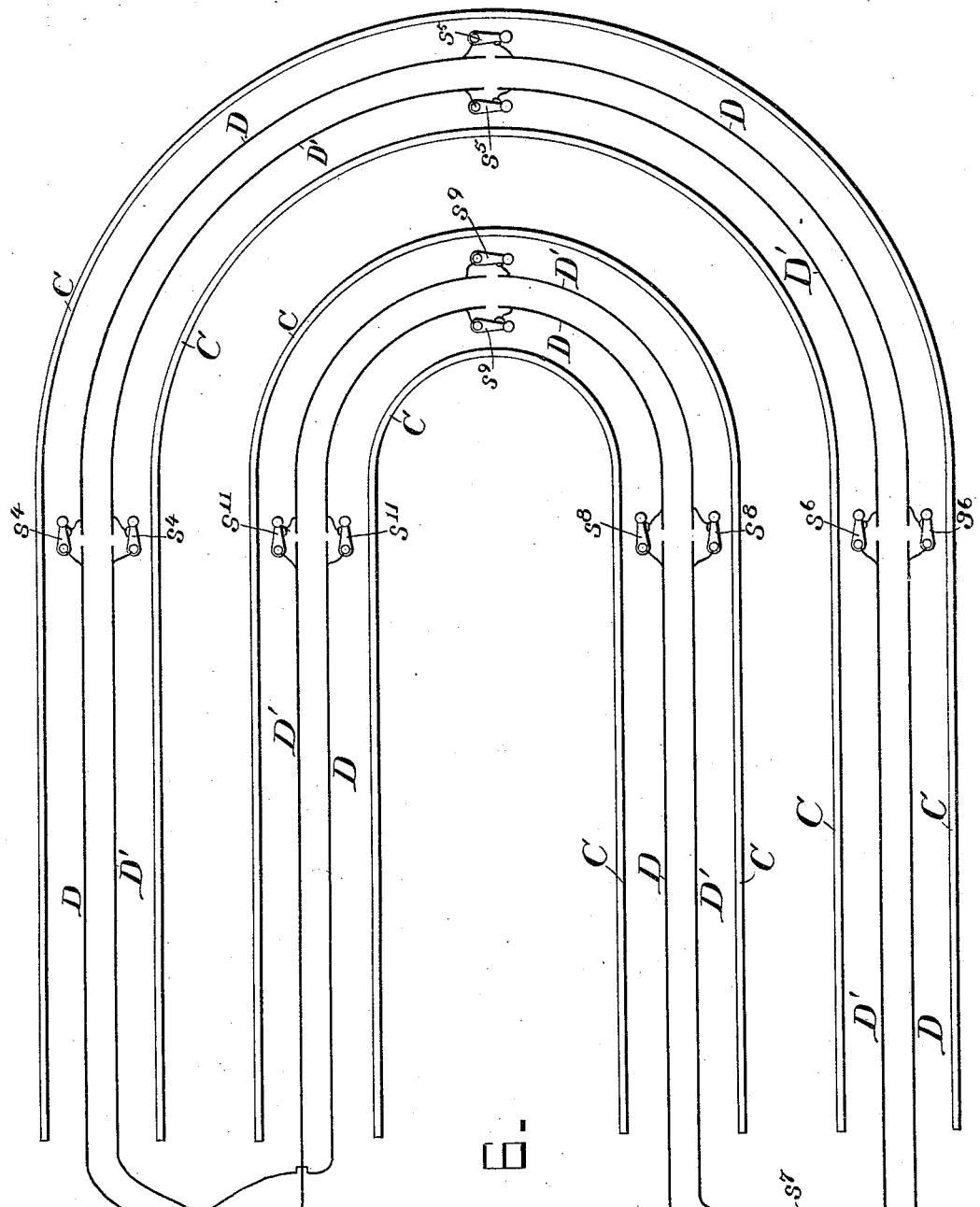

(No Model.) 6 Sheets—Sheet 4.
M. L. WOOD.
ELECTRIC RAILWAY.
No. 553,799. Patented Jan. 28, 1896.
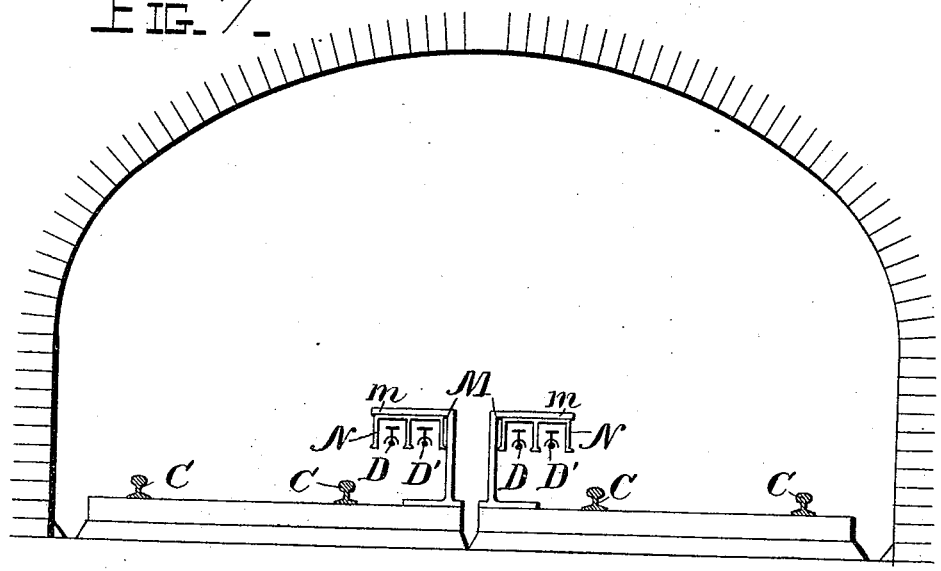
Fig. 7.
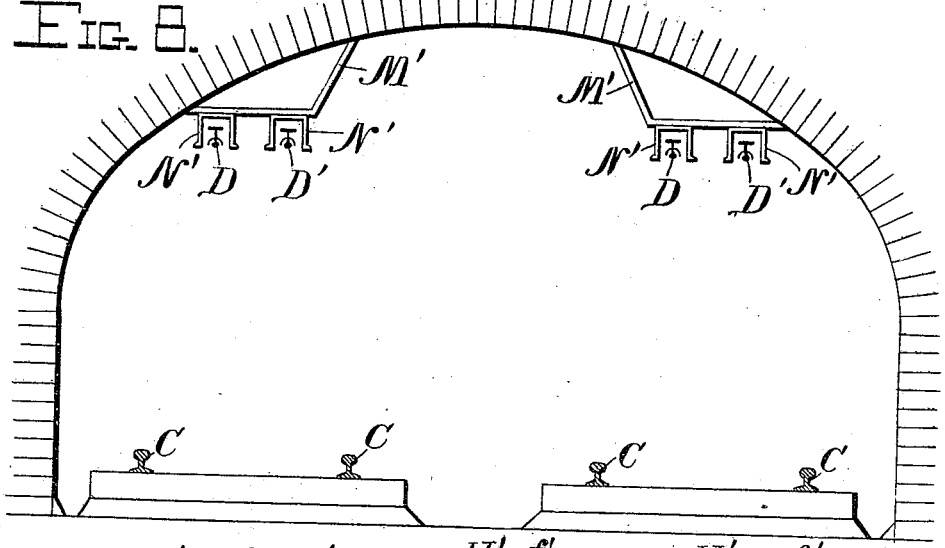
Fig. 8.
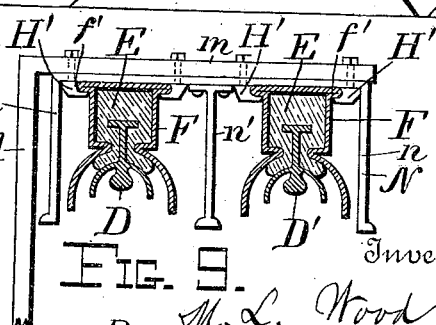
Fig. 9ª. Fig. 9.
Witnesses
Percy C. Bowen
John C. Wilson
Inventor
M. L. Wood,
By Whitman & Wilkinson
Attorneys.

(No Model.) 6 Sheets—Sheet 5.
M. L. WOOD.
ELECTRIC RAILWAY.
No. 553,799. Patented Jan. 28, 1896.
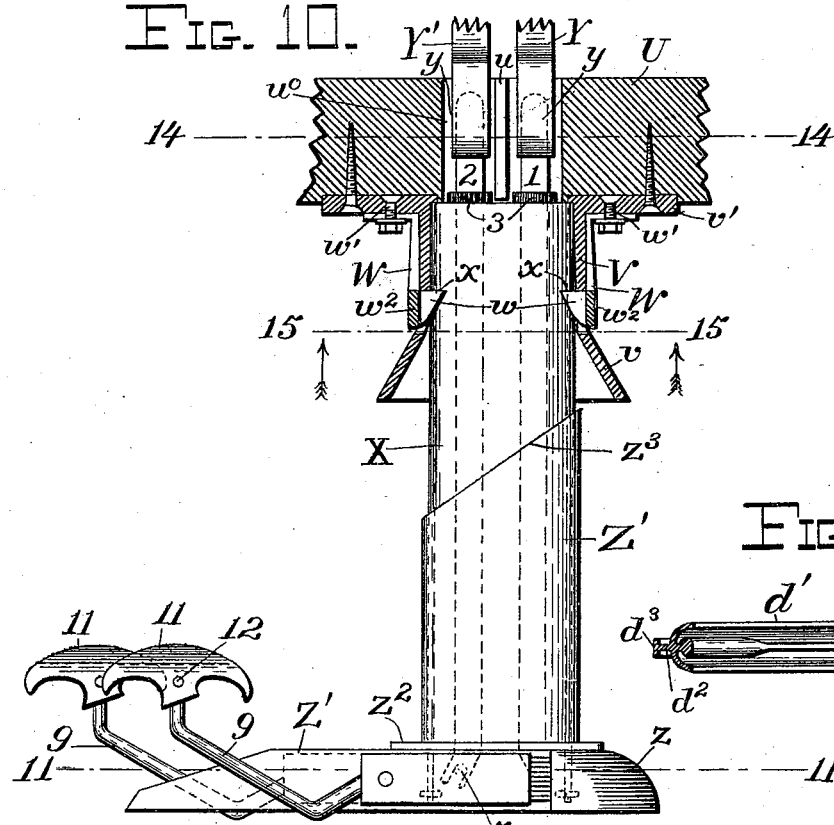
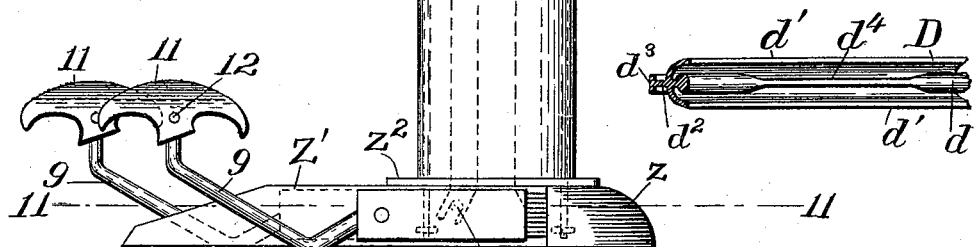
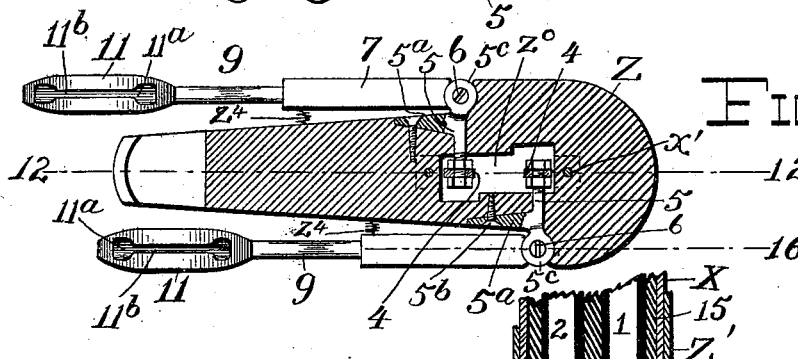
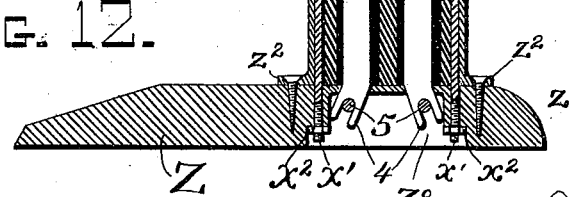
Witnesses
Roy C. Bowen.
John C. Wilson.
Inventor
M. L. Wood,
By Whitman & Wilkinson
Attorneys.

(No Model.) 6 Sheets—Sheet 6.
M. L. WOOD.
ELECTRIC RAILWAY.
No. 553,799. Patented Jan. 28, 1896.
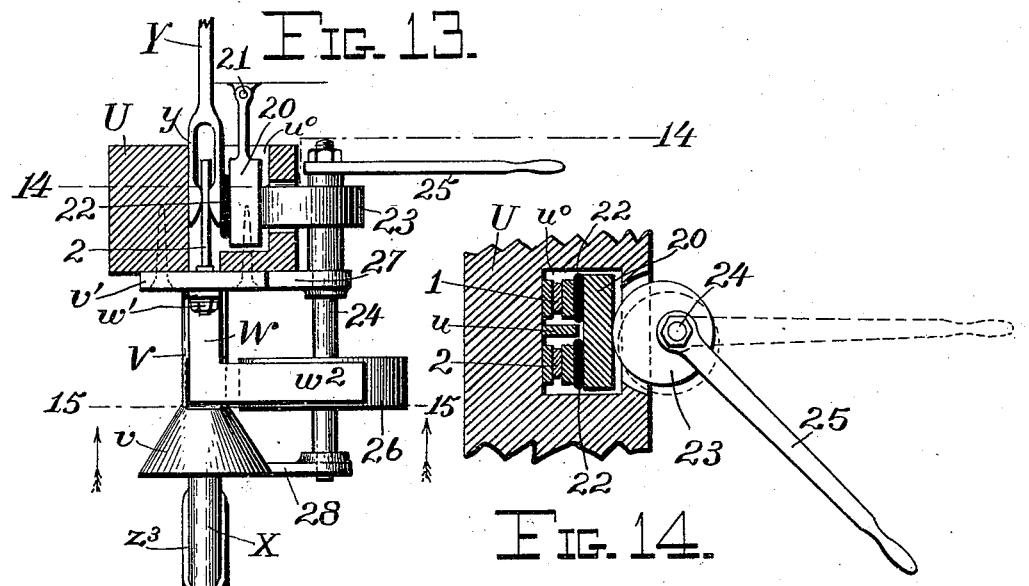
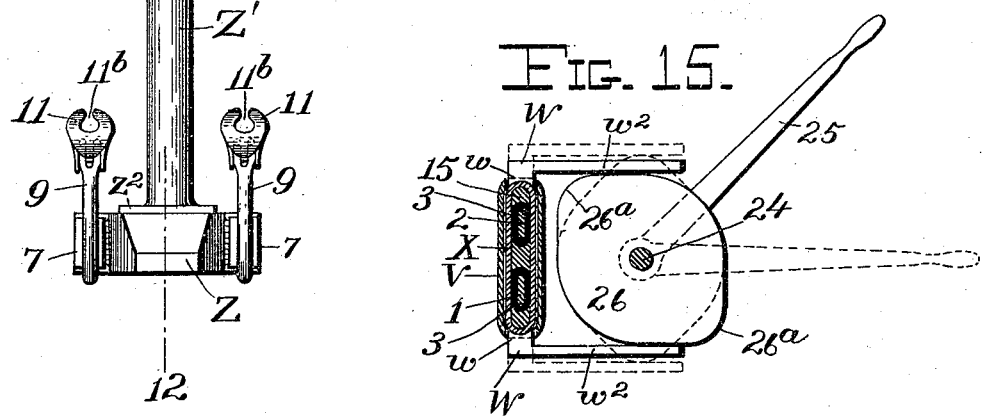
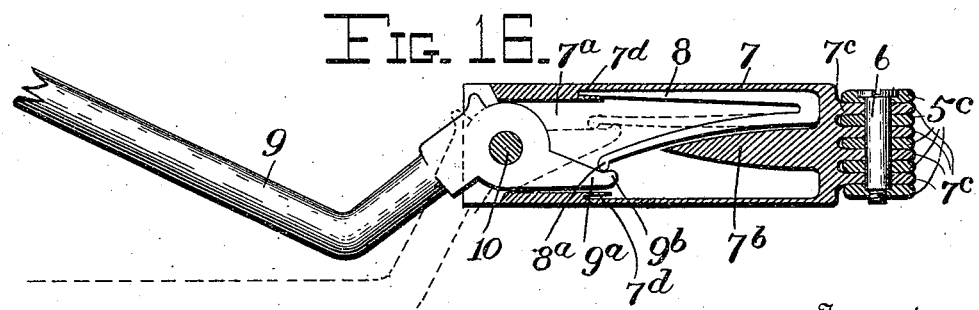
Witnesses
Percy C. Bowen
John C. Wilson
Inventor
M. L. Wood,
By Whitman & Wilkinson
Attorneys

UNITED STATES PATENT OFFICE.

MOSES L. WOOD, OF THE UNITED STATES NAVY.

ELECTRIC RAILWAY.

SPECIFICATION forming part of Letters Patent No. 553,799, dated January 28, 1896.

Application filed September 12, 1895. Serial No. 562,315. (No model.)

*To all whom it may concern:*

Be it known that I, MOSES L. WOOD, lieutenant, United States Navy, stationed at the United States Naval Academy, Annapolis, in the county of Anne Arundel and State of Maryland, have invented certain new and useful Improvements in Electric Railways; and I do hereby declare the following to be a full, clear, and exact description of the invention, such as will enable others skilled in the art to which it appertains to make and use the same.

My invention relates to improvements in electric-railway systems; and it consists in certain improvements in the method of leading out and connecting the electric conductors in the construction, protection and support of the conductors, in the method of making connection between the said conductors and the motor, and in certain other novel features of construction and novel combinations and arrangements of parts which will be hereinafter described and claimed.

Reference is had to the accompanying drawings, in which the same parts are indicated by the same letters and figures throughout the several views.

Figure 1 represents a transverse section through a single track, showing an underground conduit with the electric conductors mounted therein. Fig. 2 represents a perspective view of one of the electric conductors with the supporting and protecting sheathing mounted thereon and with one of the insulating-blocks in position on the top of said conductor. Fig. 3 represents a perspective view of one of the supporting-clips by means of which the sheathing and the conductor inclosed therein are supported in the conduit. Fig. 4 represents a transverse section of a road-bed, showing two underground conduits with conductors suspended therein, two feed wires or conductors connected to the conductors in the conduit, and branch wires for furnishing electric light or motive power outside of the railway system. Fig. 5 represents diagrammatically the system of conductors and connections shown in Fig. 4. Fig. 6 represents the system as adapted for use without the continuous-feed wires between the tracks, and shows diagrammatically the connections whereby any portion of either track may be cut out at will without stopping traffic on other parts. Fig. 7 represents a cross-section of a tunnel, showing my improved conductors suspended on brackets placed between the tracks, the same arrangement being applicable to elevated tracks. Fig. 8 represents a similar section, showing the conductors suspended from overhead brackets. Fig. 9 represents an enlarged detail view of the conductors and the means for suspending the same shown in Fig. 7. Fig. 9ª represents an enlarged detail view of one of the conductors and the means for suspending the same, as represented diagrammatically in Fig. 8. Fig. 10 represents a side elevation of the crab or sliding shoe device for carrying the current from the conductors through the motor. As represented in Fig 10, this crab is arranged to operate in an underground conduit, but with slight modifications it may be used either at the side of the track or overhead. Fig. 11 represents a section along the line 11 11 of Fig. 10 and looking down. Fig. 12 represents a vertical section along the line 12 of Fig. 13 and the line 12 12 of Fig. 11. Fig. 13 represents a rear view of the crab and connections, partly in section, through the truck of the car. Fig. 14 represents a section along the broken line 14 14 of Fig. 13 and looking down, and also a section along the line 14 14 of Fig. 10 and looking down. Fig. 15 represents a section along the line 15 15 of Fig. 10 and also of Fig. 13 and looking up, as indicated by the arrows. Fig. 16 represents a vertical section on an enlarged scale along the line 16 of Fig. 11, and Fig. 17 represents an inverted plan view of that part of the conductor which is cut away to permit the crab-shoes to be slipped thereon.

Referring more particularly to Figs. 1, 2, 3, 4, and 6, A represents an underground conduit of any suitable or preferred shape, which is connected by means of suitable braces B and B' to the tracks C. The shape of the conduit and the method of bracing the same are not a part of my invention and may be varied as may be desired or as may become necessary.

The upper part of the conduit A is provided with the ordinary slots $a^0$ between the flanges $a$, which flanges are perforated at intervals, as at $a'$ in Fig. 1, to admit the passage therethrough of the nuts or other means for supporting the conductors in place.

The conductors represented by D and D' are generally similar in construction and in connections, and but one of them will be described.

Referring particularly to Fig. 2, the conductor D consists of a rolled cast or compound rail or beam having a bulb-shaped rail $d$ at the lower edge of the vertical web $d^2$, which is provided with curved downwardly-projecting flanges or wings $d'$ and a T-shaped cap $d^3$ or flange. This rail D may be either cast or may be rolled out and the wings $d'$ bent over, as shown. The function of these wings $d'$ is to keep the bearing-surface clean and free from particles of foreign matter, and also to enlarge the cross-section and superficial area of the conductor and act as additional guides to the claw of the crab. These conductors D and D' are made in sections and are connected together by any suitable joints (not shown) which will allow proper expansion and contraction, while the entire length of the conductors is divided into a plurality of blocks, which may be cut in or cut out singly by means of switches or other suitable connections, as shown diagrammatically in Figs. 5 and 6. These conductors are preferably supported in sheaths or guides F, preferably of rolled metal and having a flat or rounded top $f$, rolled-over edges $f'$, vertical webs $f^2$, re-entrant folded edges or ribs $f^3$, and curved wings $f^4$ to shed water from the conductor, as shown most clearly in Fig. 2. Between this sheath and the rail D are sliding insulating-blocks E, which slide on the flange of the rail D, being provided with a suitable recess $e$ for this purpose, and have curved ribs or wings $e'$ below the indented groove $e^2$, into which latter the ribs $f^3$ of the sheath F pass freely. These blocks E are slid down to the desired position on the rail D and may be held in place by pins $f^0$ or may be spaced apart by strips or blocks of wood or other insulating material of any suitable shape. These blocks E are preferably made of tough pressed glass or porcelain; but any other suitable insulating material may be used if desired. It will be seen that these blocks E not only serve to connect the sheath with the conductor and to support the conductor in the sheath, but also to insulate the conductor therein. This sheath is held in place by any suitable clips, such as that represented at H in Figs. 1 and 3 or at H' in Figs. 9 and 9ª. For underground conduits designed for this system I prefer the form of clip shown in Fig. 3, where the clip-plate is provided with two holding arms or clips $h$, which engage beneath the flanges $f'$ on the sheath F. The shape of the clip or hanger may vary with the shape of conduit used and the work required. The square head $k$ of the bolt K is let into the lower face of this plate H, as shown in Fig. 1, while the screw-threaded portion $k'$ projects upward from the back of the said plate and terminates in an eye $k^2$. These plates are drawn in place by a wire or string let down through the hole $a^3$ in the conduit, which wire or string is then made fast to the eye $k^2$, as the conductor is slipped past a connection-box in the conduit, and the plate H is drawn into position, bolt uppermost, as shown in Fig. 1. Then the nut L, previously slipped on the wire, is screwed down, and the cap-shaped lock-nut L' is screwed down over the end of the bolt, as shown in Fig. 1. This lock-nut not only locks the nut L below, but also sheds water from the top of the bolt K. As an additional precaution this lock-nut may be partly filled with tallow, paraffine, or the like, which would serve as an effectual seal against water running in through the bolt-hole.

The clip H is preferably first put approximately in place on the sheath and the two pulled up into position simultaneously.

The wings $f^4$ of the sheath are made to project below the curved wings $d'$ of the conductor, as shown most clearly in Fig. 1, and thus a double protection against moisture from above is obtained. This shape of conductor is also eminently adapted for use in tunnels or in supporting conductors above the ground for railway-work, wherever desired. Thus in Fig. 7 the two conductors D and D' are suspended from the arm $m$ of the bracket M, the details of the support being shown in detail in Fig. 9, where the flanges $f'$ of the sheaths F are held above clips H', which are bolted through the inverted trough N to the arms $m$. This trough is preferably made rectangular, with inverted vertical sides $n$ and a middle partition $n'$ bolted in, as shown in Fig. 9. Instead of using a single trough N two troughs N' may be used, as shown in Figs. 8 and 9ª. In Fig. 8 these two troughs with the conductors secured therein are attached to overhead brackets M', and the car (not shown) is provided with shoes of the hereinafter-described construction or with any suitable form of trolley.

In the cross-section shown in Fig. 4 P represents a connecting-box, drained by the drain-pipe $q$ and the sewer Q. These connecting-boxes are provided with insulating-pipes R', through which the connections are made with the feed-wires or conductors T and T' contained in the conduit R.

$R^2$ represents an insulating-pipe, through which are led out the wires $t$ and $t'$ for operating electric lights, or furnishing motive power outside of the railway system proper.

S represents a conducting-plate provided with a plurality of switches $s'$, $s^2$, and $s^3$, for connecting together the two ends of each section of the conductors D and D' and also for making connection with the auxiliary wires $t$ and $t'$. These plates are connected with the feed-wire T, as shown in Fig. 4.

Where the feed-wires are not carried through the system, but terminate at one part of the system, as shown in Fig. 6, these plates S may be omitted and simple switches or other equivalent devices, such as $s^4$ $s^5$ $s^6$ $s^7$ $s^8$ $s^9$ $s^{11}$, may be provided for putting in or cutting out any block of either or both conductors.

It will be obvious from an inspection of Fig. 6 that if either one or both of the conductors in any block be cut off from the adjacent blocks—as by opening one or both of the switches at each end of the said block—the current would flow from the conductors T T' to the open switches and also around the end of the system to the open switches at the other end of the block so cut out, and thus the conductors on the opposite side would serve as feed-wires, and the feed-wires T and T', as shown in Figs. 4 and 5, may be dispensed with, whereby much greater economy is obtained. In the same way a single conductor may be led from the wire T through the system, the earth forming the return-circuit in place of the conductor D'.

It will be seen that the herein-described construction of conductor provides a light and rigid conductor of high electrical efficiency capable of carrying currents of large quantity and high voltage. Moreover, the conductor being made in lengths connected together and readily accessible any defective length may be taken out or any suspected length examined at any time. These lengths of conductors should be connected together by any suitable expansion-joint. (Not shown.)

Where feed-circuits are done away with, as shown in Fig. 6, the working conductors D and D' should be made large enough to carry the required current, and if it be desired to utilize part of this current for other purposes branch wires may be provided, such as $t$ and $t'$. (Shown in Fig. 4.) Thus in the day-time surplus currents could be used for small motors for commercial purposes, while at night electric lights might be furnished with the surplus electricity through the branch wires already described.

In order to take the current from the working conductors D and D', I have designed the form of collector or "crab" shown in Figs. 10 to 16, which will now be described in detail. In these figures U represents a portion of the car-truck frame provided with a recess $u^0$ separated into two chambers or passages $u$, into which project the resilient forks $y$ of the contact-strips Y and Y', which are connected to the terminals of any suitable motor or motors carried by the car.

Secured beneath the part U is an oblong sleeve V, terminating at its lower end in an inverted elliptical funnel $v$ and at its upper end provided with flanges $v'$ by means of which it is secured to the said part U. Bolted to this sleeve V and on either side thereof are two spring-clips W having wedge-shaped holding-teeth $w$ which engage in corresponding recesses $x$ in the shell X, which is in the form of a flattened cylinder and projects downward into the slot of the conduit. These spring-clips W are secured to the sleeve V with the bolts $w'$ and are provided with laterally-projecting arms $w^2$ whereby the said spring-clips may be disengaged, as will be hereinafter more fully described.

The shell X is provided near its lower end with a sleeve Z', which serves not only to stiffen and strengthen the said shell, but also to support the shoe Z, which is secured to the flange $z^2$ at the base of said sleeve Z'. The top of said sleeve Z' may be cut away, as shown at $z^3$, or left square, if desired. The front of the shoe Z is preferably rounded, as shown at $z$, while the said shoe is provided with a chamber $z^0$ on the lower side thereof, as shown in Figs. 11 and 12. This shoe is made of wood or other suitable insulating material. The shell X contains two conducting-strips 1 and 2, surrounded with insulating material 3 and packed tightly in the shell X by means of the filling-pieces 15, as shown in Fig. 15. These strips project up into the forks $y$, as shown in Figs. 10 and 13, and are themselves bifurcated at their lower ends, as shown at 4 in Fig. 12, which forked ends are in electrical connection with the bolts 5 secured in the shoe Z, which bolts are insulated from each other, as shown in Fig. 11. These bolts are provided with laterally-extending wings $5^a$, which are screwed to the shoe Z, as shown in Fig. 11. The outer ends of these bolts or conductors are divided into a plurality of eyes $5^c$ which interpenetrate with the eyes $7^c$ of the metallic arms 7, and the said eyes $5^c$ and $7^c$ are held together and in contact by means of the pivot-pin 6, on which the said arm 7 is pivoted. This arm 7 is provided with a central chamber $7^a$, a tongue $7^b$ in said chamber, and indentations $7^d$ in the inner sides of said chamber to receive the end of the spring 8, which fits in between the said wall in the said tongue and is provided with a rounded tip $8^a$ to engage the short lever-arm $9^a$ at the inner end of the arm 9, which arm is pivoted on the pin 10 in the said arm 7. This chamber $7^a$ is so arranged that the spring may be placed on either side thereof, whereby the parts are made reversible if desired. The lever-arm $9^a$ is rounded, as at $9^b$, so as to engage the end $8^a$ of the spring should the arm 9 be swung back in the position indicated by the dotted lines. This arm 9 carries a claw 11 at the outer end thereof, which claw is pivoted on the said arm, as at 12. The claw 11 is provided with a groove $11^a$ provided with overhanging lips or flanges $11^b$, which flanges slide against the web of the conductor above the bulb $d$.

The conductors D are provided at intervals with reduced portions $d^4$, by means of which the claws 11 are slipped up on the conductors at convenient points so that when the claws are slid along a short distance the groove in the claw engages the bulb of the conductor, and while the claw is free to slide thereon it cannot be shaken off or detached except at these cut-away portions $d^4$ of the conductor. The claw 11 is normally pressed firmly against the lower side $d$ of the conductor by means of the sear-spring 8, and thus there is no tendency of the crab-claw 11 to fall away from contact with the conductor.

Since the claws 11 are held firmly on the conductor under normal conditions, in order to provide that the minimum damage be done in case the car leaves the track, the shoe Z is attached to the shell X only by means of the bolts $x'$, cut out of or attached to the lower end of the said shell, and the nut $x^2$, as shown in Fig. 12. Now should the car leave the track these bolt ends $x'$ will be broken off and the shoe Z and the sleeve Z' will fall into the conduit, whence they may be removed without difficulty, while the injured shell X may be readily replaced by a fresh one. When the shoe is broken off in this manner, the claws will still remain hanging on the conductors, but the arms 9 will be insulated from each other and from the ground by means of the shoe, and no current will either be short-circuited or enter the ground. These arms 9 are kept clear of the shoe Z by means of the springs $z^4$, whereby the claws 11 may be more readily shipped on the conductors; but these springs may be omitted, if desired, and the claws 11 may be guided into place by hand. Once on the conductor, these claws take care of themselves. It will be seen that by this arrangement a broad and continuous area of contact between the conductor and the collecting-crab is at all times maintained, while the shape of the claw allows the car to be run backward at moderate speed or forward at high speed.

The shell X, together with the sleeve Z' and shoe Z, may also be dropped by hand when desired, as will be hereinafter more fully described.

Referring especially to Figs. 13 to 15, 20 represents a plate suspended at 21 and separated from the forks $y$ by the insulating-strips 22, which strips are preferably permanently attached to the plate 20. This plate 20 is pressed toward the forks $y$ by the cam 23, mounted on the vertical shaft 24 and operated by the hand-lever 25. Thus by means of this hand-lever a firm connection is made between the forks $y$ and the conducting-strips 1 and 2. This shaft 24 is journaled in the plate 27 and in the projection 28 from the sleeve V, and between these journal-bearings is mounted a double cam 26, having double cam-surfaces $26^a$, which engage the arms $w^2$ of the resilient catches W. The relations of the cams 23 and 26 is such that the spring-catches W are in engagement when the forks $y$ and the strips 1 and 2 are pressed together, the two cams then being in the positions shown in Figs. 14 and 15 in full lines; but when the cam 26 is in operation the cam 23 is out of engagement, and thus the same motion of the hand-lever 25 that releases the spring-catches from engagement relieves the pressure of the forks $y$ on the contact-strips 1 and 2. This latter motion of the hand-lever (indicated by the dotted lines in Figs. 14 and 15) simultaneously disengages the spring-catches and allows the contact-strips to drop out of forks $y$. Thus it will be seen that the shell X and parts carried thereby may be readily slipped into place from beneath when desired, and then clamped into position by the hand-lever 25, or it may be readily disengaged by the reverse motion of the hand-lever and allowed to drop out or to be removed by hand when desired. This arrangement of crab and connections is eminently adapted for use where the connections are changed from overhead to underground working conductors.

While Figs. 10 to 16 represent a form of collector adapted for use in underground conduits, by a simple transposition of parts the same may be readily adapted for use on the side of the track, or for overhead working conductors. For use in tunnels the shell X might be simply connected to the bottom of the shoe Z, with modified attachments to the top of the car and longer arms used. It will be obvious that these and a great many other variations of the herein-described structure might be made which could be used without departing from the spirit of my invention.

Having thus described my invention, what I claim, and desire to secure by Letters Patent of the United States, is—

1. In an electric-railway system, the combination with two sets of working conductors, each in the form of a closed loop, divided into a plurality of blocks, each block being insulated from the blocks adjacent thereto, with switches making connection between the ends of adjacent blocks, and thus closing the loop, and electric connection between each loop of the working conductors and one of the terminals of a source of electricity, substantially as described.

2. An electric conductor and means for supporting the same, comprising a rail flanged at the top, blocks of insulating material adapted to slide on said rail, and to engage beneath said flange, said blocks being provided with longitudinal grooves in the sides thereof, and a sheath provided with outwardly-projecting flanges on the top thereof, and inwardly-projecting flanges adapted to engage in said grooves, with clips adapted to support said outwardly-projecting flanges, substantially as described.

3. An electric conductor and means for supporting the same, comprising a rail flanged at the top and provided with laterally-extending wings curved downward, blocks of insulating material adapted to slide on said rail above said wings and to engage beneath said flanges said blocks being provided with longitudinal grooves in the sides thereof, and a sheath provided with outwardly-projecting flanges on the top thereof, and inwardly-projecting flanges adapted to engage in said grooves, with clips adapted to support said outwardly-projecting flanges, substantially as described.

4. An electric conductor and means for supporting the same, comprising a rail flanged at the top and provided with laterally-extending wings, curved downward, blocks of insulating material adapted to slide on said rail above said wings, and to engage beneath said flanges, said blocks being provided with longitudinal grooves in the sides thereof, and a sheath provided with outwardly-projecting flanges on the top thereof, and inwardly-projecting flanges to engage in said grooves, with laterally-projecting wings curved downward, and clips adapted to support said outwardly-projecting flanges, substantially as described.

5. An electric conductor and means for supporting the same, comprising a rail flanged at the top and provided with a bulb-tip, blocks of insulating material adapted to slide upon said rail and to engage beneath said flange, and a continuous metallic sheath with inwardly-projecting flanges adapted to engage beneath a portion of said blocks and serving to support said rail and to protect it from moisture, with means for supporting said sheath, substantially as described.

6. An electric conductor and means for supporting the same, comprising a rail flanged at the top and provided with a bulb-tip, and laterally-projecting wings curved downward, blocks of insulating material adapted to slide upon said rail, and to engage beneath said flange, and a continuous metallic sheath with inwardly-projecting flanges adapted to engage beneath a portion of said blocks and support the same, and serving to support said rail and to protect it from moisture, with means for supporting said sheath, substantially as described.

7. An electric conductor and means for supporting the same, comprising a rail, a sheath partly inclosing said rail blocks of insulating material supported by said sheath and adapted to slide between said rail and said sheath, and to support said rail, clips with bolts projecting from the back thereof adapted to engage said sheath, and nuts for holding said bolts in position, substantially as described.

8. A clip adapted for use in supporting electrical conductors comprising a plate with hook-shaped arms, a screw-threaded bolt projecting from the back of said plate, and a nut for securing said bolt in position, substantially as described.

9. A clip for use for supporting conductors of electricity comprising a plate with hooked edges, a screw-threaded bolt attached to said plate, with an eye in the end of said bolt, a nut for securing said bolt in position, and an inverted cup-shaped nut screwed over said eye and locking said lower nut, substantially as described.

10. A clip for use for supporting conductors of electricity comprising a plate with means for attaching same to the conductor, a screw-threaded bolt attached to the back of said plate with an eye in the end of said bolt, a nut for securing said bolt in position, an inverted cup-shaped nut screwed over said eye and locking said lower nut in position, and a filling of paraffine or like material contained in the said cup-shaped nut, substantially as and for the purposes described.

11. In an electric-railway system, the combination with a shoe and collectors of electricity carried thereby, of a shell connecting said shoe with the body of the car, and weak bolts connecting said shell with said shoe which are adapted to be broken when the car leaves the track, substantially as described.

12. In an electric-railway system, the combination with an insulating-shoe, and collectors of electricity carried thereby, of a shell supporting said shoe and provided with notches in the side thereof, and spring-clips carried by the car and adapted to engage in said notches, with means for releasing said spring-clips, when desired, substantially as described.

13. In an electric-railway system, the combination with a shoe, and a pivoted claw carried thereby, and adapted to collect electricity from the working conductor, of a shell supporting said shoe and connected to the bottom of the car, a conductor connecting said claw with the motor carried by the car, and weak bolts connecting said shell with said shoe and adapted to be broken when the car leaves the track, substantially as described.

14. In an electric-railway system, the combination with a shoe and a collector of electricity carried thereby, of a shell supporting said shoe and containing a conductor electrically connected with said collector, the said shell being provided with notches therein in the side thereof a spring-clip adapted to engage in each of said notches and means for releasing said spring-clips and allowing said shell to drop out or be withdrawn, substantially as described.

15. In an electric-railway system, the combination with a shoe carrying a collector of electricity of a shell connected to said shoe and provided with an electric conductor extending therethrough, the said shell being notched, of a guide-funnel adapted to guide said shell into the proper position, spring-clips provided with outwardly-projecting arms, the said clips being adapted to engage in the notches of the said shell, a double cam adapted to simultaneously release said catches, and means for operating said cam by hand, substantially as described.

16. In an electric-railway system, the combination with a shell carrying an electric conductor, and means for connecting said shell with the working conductor, the said shell being provided with notches therein, and the said conductor carried by said shell projecting from the inner end thereof, of a contact-strip connecting said conductor with the motor carried by the car, spring-clips adapted to engage in said notches in said shell and provided with outwardly-projecting arms, a shaft carrying a cam adapted to press said conductor and said contact-strip together, mounted on said shaft, and a double cam also mounted on said shaft and adapted to disengage said clips when the first cam is out of engagement, with means for rotating said shaft by hand, substantially as described.

17. In an electric-railway system, the combination with a detachable device for collecting the electricity and carrying the same to the car, of a contact-strip projecting from said device, and making connection with a conductor from the car, clips adapted to automatically engage said detachable device, and means for simultaneously compressing said conducting-strip and conductor together, and for drawing said clips into engagement and also for simultaneously releasing the pressure on said conductor and said conducting-strip and disengaging said clips, substantially as described.

18. In an electric-railway system, the combination with a detachable device for collecting the electricity and carrying the same to the car, of a contact-strip projecting from said device and making connection with a conductor from the car, clips adapted to automatically engage said detachable device and provided with projecting arms, a double cam adapted to engage said clips, a single cam adapted to press said contact-strip and said conductor together, and means for simultaneously operating said cams, substantially as and for the purposes described.

19. An electric conductor and means for supporting the same, comprising a rail, a continuous sheath, partly inclosing said rail, blocks of insulating material supported by said sheath and adapted to slide between said rail and said sheath, and to support said rail, and clips engaging said sheath, with means for supporting said clips, substantially as described.

In testimony whereof I affix my signature in presence of two witnesses.

MOSES L. WOOD.

Witnesses:
GEORGE FORBES,
RICHARD HUGHES.